Figure 1:
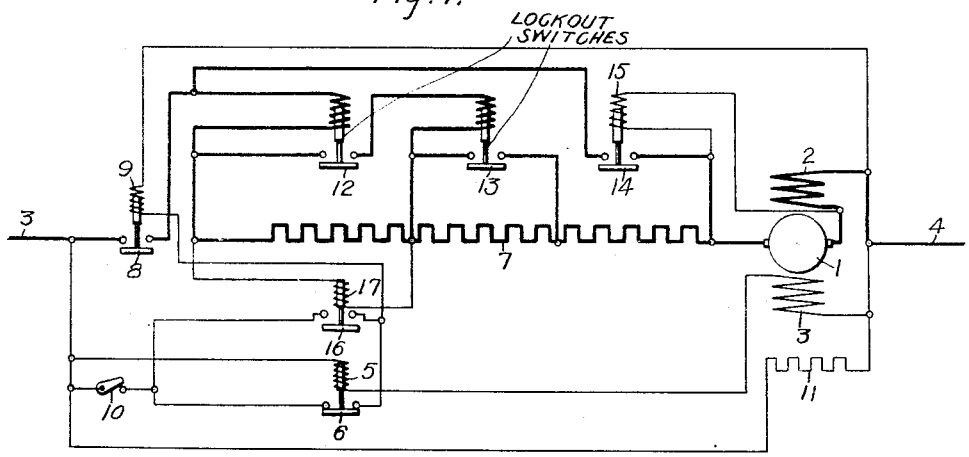

May 27, 1924.

E. M. BOUTON ET AL 1,495,766

CONTROL SYSTEM

Filed June 9, 1919

WITNESSES:
J. A. Helsel
R. J. Fitzgerald

INVENTORS
Edgar M. Bouton
George W. Hurtt.
BY
Wesley G. Carr
ATTORNEY

Patented May 27, 1924.

1,495,766

UNITED STATES PATENT OFFICE.

EDGAR M. BOUTON AND GEORGE W. HURTT, OF WILKINSBURG, PENNSYLVANIA, ASSIGNORS TO WESTINGHOUSE ELECTRIC & MANUFACTURING COMPANY, A CORPORATION OF PENNSYLVANIA.

CONTROL SYSTEM.

Application filed June 9, 1919. Serial No. 302,702.

*To all whom it may concern:*

Be it known that we, EDGAR M. BOUTON, a citizen of the United States, and a resident of Wilkinsburg, in the county of Allegheny and State of Pennsylvania, and GEORGE W. HURTT, a citizen of the United States, and a resident of Wilkinsburg, in the county of Allegheny and State of Pennsylvania, have invented a new and useful Improvement in Control Systems, of which the following is a specification.

Our invention relates to control systems and particularly to systems for controlling compound-wound, direct-current motors.

The object of our invention is to provide an improved control system of the above-designated character.

Control systems for shunt and compound-wound direct-current motors are ordinarily provided with a relay having an actuating coil in circuit with the shunt field-magnet winding for controlling the circuit of the actuating coil of the line contactor that is adapted to connect the motor to the source of energy. The transformer action between the series and shunt field-magnet windings of compound-wound motors results in reversing the current traversing the shunt field-magnet winding and, therefore, also the current traversing the relay coil, so that the relay becomes opened during such time as the transformer action exists, that is, for a very brief period of time following the starting of the motor. The opening of the relay, of course, results in the opening of the line contactor and the disconnecting of the motor from the line.

In accordance with our invention, the opening of the relay has no effect upon the line contactor because the circuit of its actuating coil is adapted to be maintained closed by an additional relay having an actuating coil that is responsive to the voltage of the accelerating resistor. If desired, this second relay may be eliminated and the ordinary field relay be provided with both coils. Upon the initial closing of the motor circuit, the coil that is in circuit with the shunt field-magnet winding becomes effective, with the result that the line contactor is, for the time, maintained closed. During the above-mentioned transformer action, this coil becomes inoperative, but its effect is replaced by the coil that is connected across the accelerating resistor. The accelerating resistor is ultimately short-circuited so that the coil that is controlled in accordance with the voltage of this resistor becomes ultimately inoperative. Before this takes place, however, the coil that is in series with the shunt field-magnet winding becomes again operative, so that the line contactor is maintained closed.

Figure 2:
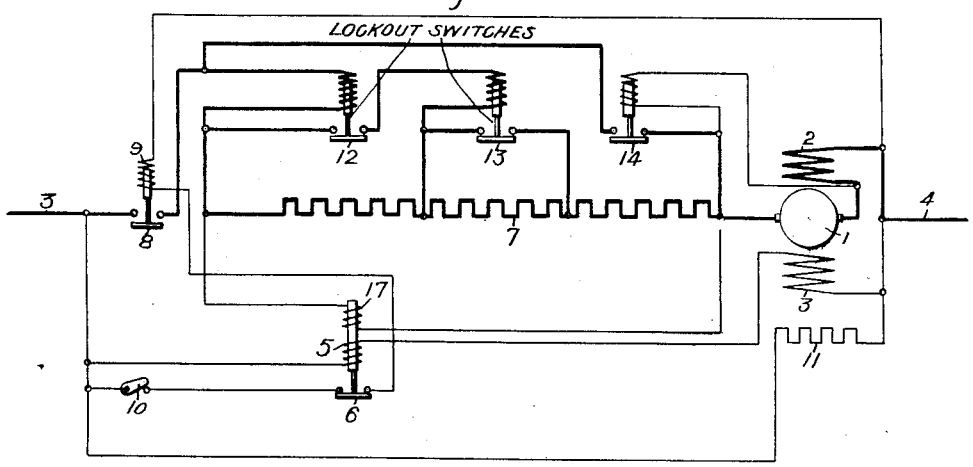

Our invention will be made clear in connection with the accompanying drawings in which Figure 1 is a diagrammatic view of circuits and apparatus embodying our invention and Fig. 2 is a diagrammatic view of a modification.

A compound-wound motor, having an armature 1, a series field-magnet winding 2 and a shunt field-magnet winding 3, is adapted to be supplied with energy from any suitable source of direct current by line conductors 3 and 4. The shunt field-magnet winding 3 is permanently connected to the line conductors 3 and 4 in circuit with a controlling coil 5 for a field relay 6 but the armature 1 and an accelerating resistor 7 in series therewith, are normally disconnected from this source of energy and are adapted to be connected thereto by a line contactor 8 having an actuating coil 9 that is in series with the field relay 6 and a master switch 10. A suitable discharge resistor 11 may be provided for the shunt field-magnet winding 3. The resistor 7 may be adapted to be short-circuited in any well-known manner as, for example, by means of lockout contactors 12 and 13 and a contactor 14 having an actuating coil 15 that is controlled in accordance with the counter-electromotive force of the motor.

In the system of Fig. 1, an additional relay 16 is provided for the circuit of the coil 9 having an actuating coil 17 that is connected across a portion or across the whole of the resistor 7. In the system of Fig. 2, the additional relay is dispensed with and the coil 17, like the coil 15, is adapted to control the same relay 6.

The shunt field-magnet winding 3 and the coil 5 are normally, continually energized, since they are permanently connected to the line conductors 3 and 4. If desired, the customary field rheostat may be connected in the circuit of the winding 3. To start the motor, the master switch 10 is closed to establish a circuit from the line conductor 3, through the master switch 10, the field relay 6, which is normally closed by its actuating coil 5 and the coil 9, to the line conductor 4. The line contactor 8 is thereupon closed by its actuating coil 9 to establish the armature circuit, which extends from the line conductor 3, through the line contactor 8, the actuating coil of the lockout contactor 12, the resistor 7, the armature 1 and the series field-magnet winding 2, to the line conductor 4. In accordance with the well-known principle of the lockout contactor, the lockout contactor 12 will be maintained open for a period of time following the initial closing of the armature circuit.

The establishing of the armature circuit sets up a transformer action in the field-magnet windings 2 and 3, which results initially in a reversal of current in the shunt field-magnet winding 3 and, therefore, also in the coil 5. The relay 6 would, therefore, tend to fall open by gravity. In the system of Fig. 1, the relay 6 does so open but the relay 16 becomes first closed by its actuating coil 17, which is energized in accordance with the voltage drop across a portion of the resistor 7, thereby establishing a circuit for the coil 9 from the line conductor 3, through the master switch 10, the relay 16 and the coil 9, to the line conductor 4. The opening of the relay 6, therefore, has no effect upon the line contactor 8, which remains closed.

In the system of Fig. 2, the relay 6 cannot become open because, although the current traversing the coil 5 becomes reversed in direction, the coil 17 becomes energized in accordance with the voltage drop in a portion or the whole of the resistor 7, thereby maintaining the relay 6 and, of course, also the contactor 8, closed.

The transformer action of the field-magnet windings 2 and 3 takes place but for a very brief period of time. Normal conditions become soon re-established and the relay 6 of Fig. 1 becomes reclosed or, in the case of the system of Fig. 2, the coil 5 becomes again effective to maintain the relay 6 closed. In either event, the circuit of the coil 9 is maintained closed so that the line contactor 8 is maintained in its actuated position, and the armature circuit is maintained closed. When later, following the closing of the lockout contactors 12 and 13 and the ultimate closing of the contactor 14 to effect the final short-circuiting operation of the resistor 7, the coil 17 becomes de-energized, the need for this coil 17 has disappeared, since the coil 5 has become again fully operative.

According to our invention, then, provision is made for maintaining the line contactor of a compound-wound motor closed during the brief period of time when transformer action takes place between the field-magnet windings of the motor, just after the motor circuit is first closed. During that brief period of time, the coil 17 is controlled in accordance with the voltage of the accelerating resistor; later, when this resistor becomes short-circuited, normal conditions again obtain so that the coil 17 is no longer needed.

Although we have shown two specific embodiments of our invention, it will be understood that the invention itself is of broader scope and that it is not limited except in so far as express limitations may be imposed in the appended claims.

We claim as our invention:

1. The combination with a motor having an armature and field magnet windings in series therewith and in shunt thereto, a resistor in series with said armature, a source of energy, and a switch for connecting said motor to said source having an actuating coil, of a switch for controlling the circuit of said coil having an actuating coil in circuit with said shunt field-magnet winding, said switch including means controlled by the voltage of said resistor for controlling said connecting-switch coil.

2. The combination with a motor having an armature and field-magnet windings in series therewith and in shunt thereto, a starting resistor in series with said armature, a source of energy, and a switch for connecting said motor to said source having an actuating coil, of a switch for opening and closing the circuit of said coil having controlling coils respectively connected in series with said shunt field-magnet winding and across a portion of said resistor.

3. The combination with a dynamo-electric machine having an armature and a field-magnet winding, a translating device and a switch in circuit with said armature, of a second switch for governing the first-named switch and itself governed by the current traversing said field winding, said second switch embodying means controlled by the voltage of said device for governing said first-named switch.

4. The combination with a motor having an armature and a shunt field-magnet winding, a resistor and a switch in circuit with said armature, of a second switch for governing the first-named switch and having an actuating coil in circuit with said field winding, said second switch embodying means controlled by the voltage of said resistor for governing the first-named switch.

In testimony whereof, we have hereunto subscribed our names this 29th day of May, 1919.

EDGAR M. BOUTON.
GEORGE W. HURTT.